United States Patent
Villis

(10) Patent No.: US 12,350,712 B2
(45) Date of Patent: Jul. 8, 2025

(54) APPARATUS FOR SORTING AND REMOVING CONTAMINATING MATTER FROM MECHANICALLY HARVESTED FRUIT

(71) Applicant: AUSSIE WINE GROUP HOLDINGS PTY LTD, Stirling (AU)

(72) Inventor: Malcolm Villis, Woodside (AU)

(73) Assignee: Aussie Wine Group Holdings Pty. Ltd., Stirling (AU)

( * ) Notice: Subject to any disclaimer, the term of this patent is extended or adjusted under 35 U.S.C. 154(b) by 0 days.

(21) Appl. No.: 18/407,172

(22) Filed: Jan. 8, 2024

(65) Prior Publication Data

US 2024/0139777 A1 May 2, 2024

Related U.S. Application Data

(63) Continuation of application No. 17/770,609, filed as application No. PCT/IB2021/057122 on Aug. 3, 2021, now Pat. No. 11,911,795.

(30) Foreign Application Priority Data

Aug. 3, 2020 (AU) ................................ 2020904882
Jun. 30, 2021 (AU) ................................ 2021902003

(51) Int. Cl.
*B07B 9/00* (2006.01)
*A23N 15/02* (2006.01)
(Continued)

(52) U.S. Cl.
CPC .............. *B07B 9/00* (2013.01); *A23N 15/025* (2013.01); *B07B 1/10* (2013.01); *B07B 1/155* (2013.01)

(58) Field of Classification Search
CPC .. B07B 9/00; B07B 1/10; B07B 1/155; A23N 15/025
See application file for complete search history.

(56) References Cited

U.S. PATENT DOCUMENTS 7,166,027 B2 * 1/2007 Messenger ........... A01D 46/285
460/114
8,708,153 B2 4/2014 Hufford ................ B07B 13/003
209/660
(Continued)

FOREIGN PATENT DOCUMENTS

AU 2005201250 A1 10/2005
AU 2018100313 A4 * 4/2018
(Continued)

OTHER PUBLICATIONS

YouTube video at https://www.youtube.com/watch?v=qHb_w0cNrG0, see time stamp 0:45-0:49; 2:13-2:14; and 2:17-2:19, retrieved on Oct. 23, 2023.

*Primary Examiner* — Patrick H Mackey
(74) *Attorney, Agent, or Firm* — Bryan Cave Leighton Paisner LLP

(57) ABSTRACT

A separation apparatus for separating fruit from other plant matter from harvested plant material, the apparatus comprising a conveyor system that defines a first separation system, a second separation system located at least partially above the first separation system comprising an array of rotatable rollers to convey harvested plant material in an upstream to downstream direction, the rollers spaced apart to provide a plurality of openings permitting the transit of separated fruit therethrough while preventing the transit of other plant matter, a third separation system in the form of a de-stemming unit downstream of the second separation system, a plant matter distribution system, for distributing plant matter away from the collection apparatus, wherein
(Continued)

fruit pass through any one or more of the first, second and third separation systems for collection in the collection unit.

17 Claims, 10 Drawing Sheets

(51) Int. Cl.
    *B07B 1/10*     (2006.01)
    *B07B 1/15*     (2006.01)

(56) References Cited

U.S. PATENT DOCUMENTS

| | | | |
|---|---|---|---|
| 9,027,759 B2 | 5/2015 | Jones | B07C 5/368 |
| | | | 209/939 |
| 11,911,795 B2* | 2/2024 | Villis | A01D 46/285 |
| 2006/0270474 A1 | 11/2006 | Messenger | |
| 2008/0236126 A1* | 10/2008 | Leonini | A01D 46/28 |
| | | | 56/330 |
| 2010/0132326 A1 | 6/2010 | Berthet | |
| 2019/0343047 A1 | 11/2019 | De Bolle | A01D 57/20 |
| 2021/0051851 A1* | 2/2021 | Rico | A01D 46/285 |
| 2021/0282324 A1 | 9/2021 | Villis | A01D 46/285 |

FOREIGN PATENT DOCUMENTS

| | | | | |
|---|---|---|---|---|
| AU | 2019296521 A1 | 2/2021 | | A01D 46/22 |
| WO | 2020000060 A1 | 1/2020 | | |

\* cited by examiner

APPARATUS FOR SORTING AND REMOVING CONTAMINATING MATTER FROM MECHANICALLY HARVESTED FRUIT

CROSS-REFERENCE TO RELATED APPLICATION(S)

This application is a continuation application of co-pending allowed U.S. patent application Ser. No. 17/770,609, filed Apr. 20, 2022, which is a National Stage Application of International Application No. PCT/IB2021/057122 filed on Aug. 3, 2021, which claims priority to and the benefit of Australian Patent Application No. 2020904882, filed on Aug. 3, 2020, and Australian Patent Application No. 2021902003, filed on Jun. 30, 2021.

FIELD OF THE INVENTION

The present invention relates to an apparatus for sorting mechanically harvested berries to remove contaminating matter from the berries.

BACKGROUND TO THE INVENTION

Traditionally, berries such as grapes were harvested by hand. However, as technology has improved, driven by the need to increase the speed of harvesting and decrease the cost, the process for harvesting berries has become increasingly automated. The most commonly used mechanical berry harvesters are grape harvesters. Mechanical grape harvesters are used throughout the world to rapidly remove grapes from grape vines during vintage. Problematically, however, mechanical grape harvesters also remove matter other than grapes MOG. Such contaminating matter is undesirable in the harvested grapes and if not removed can lead to significant alterations in the flavour of wine produced from grapes. This is particularly important when producing red wine whereby the grape juice is fermented together with the skin and any contaminating matter for a prolonged period of time.

Consequently, wineries typically grade all grapes that are provided from vineyards based on the level of MOG contamination and will pay less for grapes that have a high percent of contaminating matter. In some instances, wineries will reject grapes that have too much contamination. As a result, mechanical grape harvesters are operated in a manner that aims to reduce the concentration of contamination in harvested grapes. One such way to reduce contamination is to operate the harvester at a slower speed. However, this is undesirable as it increases the cost of harvesting the grapes and may offset any value added to the grapes by decreasing contamination.

Mechanical grape harvesting machines generally work by providing a channel through which grape vines can be passed as the mechanical harvester moves along a row of grape vines. The harvesters have a harvesting head that sits either side of the vines and vibrates in a lateral direction thereby laterally shaking the vines. As a result, grapes fall from the vines and are collected by the mechanical harvester and fed by a conveyor system to one or more outlets. Typically, a mechanical grape harvesting machine will have two outlets positioned toward either side of the harvesting machine that are provided with berries by two independent conveyor systems. These outlets either directly deposit the harvested grapes into a collection unit, or the grapes are deposited on a further conveyor system which transports the grapes to a discharge conveyor that extends to one side of the harvesting machine, or the rear of the harvesting machine, and then deposits the harvested grapes into a "chaser" or trailing collection unit which are transported alongside or behind the harvester.

In order to allow for the mechanical harvesters to operate at increased speed and reduce the level of contaminating matter in the harvested grapes, devices for the removal of contaminants and waste plant matter have been developed. These devices can generally be categorised into two groups; firstly, devices that remove contaminants after harvesting and collection and prior to fermentation; and secondly devices fitted to the harvesters themselves that remove contaminants during harvesting.

Problematically, however, once the grapes are provided to a winery, the grapes will be assessed for contamination, and any penalties will be imposed. Therefore, it is preferable to utilise devices fitted to the harvesters to remove contaminants prior to delivery to the winery.

Indeed, there are several such devices that have been developed for this purpose. The most primitive form of such contamination removal devices are air fans. Typically, multiple fans are positioned above the conveyor paths that transports harvested grapes to a collection unit. These fans create a vacuum above the grapes as they are transported under the fans. The vacuum sucks up some of the contaminating matter, such as leaves, into the fans which then discharges the matter from the harvester. However, such fans have limited capacity and efficacy. Consequently, more complex berry separation systems, that can be integrated in mechanical grape harvesters, have been developed. These include systems by Braud™, Gregoire™ and Pellenc™, who each provide different system for separating grapes from contaminating material.

All of the above systems are fitted to a berry harvester. Therefore, these systems need to be either integrated into the harvester during construction, or retrofitted to an existing harvester, which can be difficult and expensive. Furthermore, it is in the interest of the vineyard to produce harvested grapes which are substantially free of contaminating matter. However, very few vineyards own and operate their own mechanical harvesters. Rather most vineyards rent or lease harvesters or contract their harvesting to third party contractors. As such, they have little control over the type of harvester used, and if separating mechanisms are attached to the harvester.

Consequently, there is a need for an apparatus for separating harvested berries, such as grapes, from waste material, which can separate contaminants from harvested berries prior to delivery to a winery and can be utilised in the harvesting process without excessive effort or expense.

It is to be understood that the discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

It is an object of the present invention to address one or more of the abovementioned issues, and/or to provide a separating device for a harvester and/or to at least provide the public with a useful choice.

SUMMARY OF THE INVENTION

In a first aspect there is described a separation apparatus for a harvester, for separating berries from other plant matter from harvested plant material, the apparatus comprising:

a conveyer system that defines a first separation system moveable to define an upstream and downstream position relative to the conveyor system, the conveyor system comprising a plurality of apertures to permit the transit of berries, a second separation system located at least partially above the first separation system, the second separation system comprising an array of rollers rotatable to convey harvested plant material in an upstream to downstream direction, the rollers spaced apart to provide a plurality of openings permitting the transit of separated berries through the berries while preventing the transit of other plant matter, a third separation system in the form of a de-stemming unit downstream of the second separation system and positioned above the first separation system, a plant matter (MOG) distribution system, for distributing plant matter away from the apparatus and collection unit, and wherein berries pass through any one or more of the first, second and third separation systems for collection in the collection unit.

In a further aspect there is described a separation apparatus, configured to be fitted to a harvester side arm, for separating berries from other plant matter from harvested plant material, the apparatus comprising:

a conveyor system that defines a first separation system moveable to define an upstream and downstream position relative to the conveyor system, the conveyor system comprising a plurality of apertures to permit the transit of berries, a second separation system located at least partially above the first separation system, the second separation system comprising an array of rollers rotatable to convey harvested plant material in an upstream to downstream direction, the rollers spaced apart to provide a plurality of openings permitting the transit of separated berries through the openings while preventing the transit of other plant matter, a third separation system in the form of a de-stemming unit, downstream of the second separation system and positioned above the first separation system, and wherein berries pass through any one or more of the first, second and third separation systems for collection in the collection unit.

In a further aspect there is described a harvester side arm comprising an elongate structural support having a first end and a second end, a conveyor system that extends between the first and second ends, the conveyor system defining a first separation system moveable to define an upstream and downstream position relative to the conveyor system, the conveyor system comprising a plurality of apertures to permit the transit of berries, a second separator system located proximal to the first end and above the first separation system, the second separation system comprising an array of rollers rotatable to convey harvested plant material in an upstream to downstream direction, the rollers spaced apart to provide a plurality of openings permitting the transit of separated berries through the openings while preventing the transit of other plant matter, a third separation system in the form of a de-stemming unit, being proximal to the second end, downstream of the second separation system and positioned above the first separation system, and wherein berries pass through any one or more of the first, second and third separation systems for collection in the collection unit.

In a further aspect there is described a method of sorting harvested berries to remove contaminating plant matter from the berries, the method comprising operating a separation device for separating berries from other plant matter from harvested plant material, the apparatus comprising:

a conveyor system that defines a first separation system moveable to define an upstream and downstream position relative to the conveyor system, the conveyor system comprising a plurality of apertures to permit the transit of berries thereto, a second separator system located at least partially above the first separation system, the second separation system comprising an array of rollers rotatable to convey harvested plant material in an upstream to downstream direction, the rollers spaced apart to provide a plurality of openings permitting the transit of separated berries through the openings while preventing the transit of other plant matter, a third separation system in the form of a de-stemming system downstream of the second separation system and positioned above the first separation system, and a plant matter distribution system, for distributing plant matter (i.e. MOG) away from the apparatus and collection unit, and wherein berries pass through any one or more of the first, second and third separation systems for collection in a collection unit, and wherein the method
i) separates berries from plant materials such that the amount of contaminating plant material is less than about 2% by weight of the collected material,
ii) collects at least 98% of the available berries, or
iii) both (i) and (ii).

In a further aspect there is described a method of sorting harvested berries to remove contaminating plant matter from the berries, the method comprising attaching a separation apparatus to a harvester side arm,
operating the separating device for separating berries from other plant matter from harvested plant material, the apparatus comprising:

a conveyor system that defines a first separation system moveable to define an upstream and downstream position relative to the conveyor system, the conveyor system comprising a plurality of apertures to permit the transit of berries thereto, a second separator system located above the first separation system, the second separation system comprising an array of rollers rotatable to convey harvested plant material in an upstream to downstream direction, the rollers spaced apart to provide a plurality of openings therebetween permitting the transit of separated berries therethrough while preventing the transit of other plant matter, a third separation system, downstream of the second separation system and positioned above the first separation system, being a de-stemming unit, and wherein berries pass through any one or more of the first, second and third separation systems for collection in the collection unit, and wherein the method
i) separates berries from plant materials such that the amount of contaminating plant material is less than about 2% by weight of the collected material, ii) collects at least 98% of the available berries, or
iii) both (i) and (ii).

The following configurations may relate to any of the above aspects.

In one embodiment a portion thereof of the second separator system may be located outside of the first separator conveyer system (i.e. such that a portion of the second separator system does not extend above the first separator conveyer system).

In one embodiment about 30, 35, 40, 45, 50, 55, 60, 65, 70, 75, 80, 85 or 90% of the second separator system is located outside of the first separator conveyer system (i.e. such that a percentage of the second separator system does not extend above the first separator conveyer system).

In one embodiment a portion of the second separator system located outside of the first separator conveyer system includes a ramped section.

In one embodiment the ramped portion of the second separator system 3 may ramp at about 10, 15, 20, 25, 30, 35 or 40° from the horizontal, and suitable ranges may be selected from between any of these values.

In one embodiment the angle of the ramped section may be adjustable.

In one configuration the separation apparatus comprises a plant matter distribution system, for distributing plant matter away from the apparatus and collection unit.

In one configuration each of the separation systems and the plant matter distribution system of the separation apparatus are fitted to a harvester side arm, the side arm extending from the harvester.

In one configuration the separation apparatus defines the side arm.

In one configuration the apparatus includes a collection unit, whereby the collection unit is a trailing collection unit and/or does not form part of a harvesting apparatus.

In one configuration the array of rollers of the second separator system comprise multiple projections extending radially from the shaft of the roller, and wherein the projections extend perpendicularly from the axis of the shaft of the roller.

In one configuration the radially-extending projections extend from the shaft in an arc away from the direction of rotation of the radially-extending rollers.

In one configuration the first separation system is a continuous mesh belt mounted to rotate around upstream and downstream shafts.

In one configuration the separation apparatus is fitted to a collection unit. In one embodiment the downstream roller of the separation apparatus extends beyond the collection unit.

In one configuration the separation apparatus comprises a hopper for receiving harvested plant material and directing it to an upstream portion of the first separating conveyor system.

In one configuration the outlet of the hopper is located above the second separator system.

In one configuration the second separator system has a length and width, and wherein the outlet of the hopper is located above the second separator system in a location spaced from the upstream edge of the second separator system, wherein the spacing is at least 100 mm.

In one configuration the conveyor system, that defines the first separation system, comprises
  i) a substantially flat intermediate zone,
  ii) a ramped first zone, located upstream of the intermediate zone,
  iii) a ramped second zone, located downstream of the intermediate zone, or
  iv) any combination of (i) to (iii).

In one configuration the ramped first zone descends to the intermediate zone.

In one configuration the ramped second zone ascends from the intermediate zone

In one configuration the rotatable rollers of the second separation system are located above an upstream portion of the conveyor system of the first separation unit.

In one configuration the rotatable rollers of the second separation system are located above a portion of the intermediate zone and a portion of the ramped first zone.

In one configuration the rotatable rollers of the second separation system are arranged perpendicular to the conveyor system such that the axis of the rollers are substantially aligned with the longitudinal axis of the conveyor system.

In one configuration the rotatable rollers of the second separation system are located above the upstream shaft of the first separation system so as to overlap, in a vertical alignment, the upstream shaft of the first separation system.

In one configuration the fourth separation system comprises a conveyor system moveable in a direction perpendicular to the direction of movement of the first separation system.

In one configuration the conveyor system of the fourth separation system is located at the end of the conveyor system of the first separation system.

In one configuration the conveyor system of the fourth separation system overlaps the ramped second zone of the conveyor system of the first separation system.

In one configuration the apparatus comprises a rotatable shaft located at the downstream end of the conveyor system of the first separation system and vertically oriented below the surface of the conveyor system of the first separation system, the rotatable shaft having an axis of rotation that is perpendicular to the longitudinal axis of the conveyor system of the first separation system.

In one configuration the rotatable shaft has one or more projections along its length.

In one configuration the rotatable shaft is located above the surface of the conveyor system of the fourth separation system.

In one configuration the separation system separates berries from plant materials such that the amount of contaminating plant material is less than about 2% by weight of the collected material.

In one configuration the separation system separates berries from plant materials such that the amount of contaminating plant material is less than about 1% by weight of the collected material.

In one configuration the separation system separates berries from plant materials such that the amount of contaminating plant material is less than about 0.5% by weight of the collected material.

In one configuration the separation system collects at least 95% of the available berries.

In one configuration the separation system collects at least 98% of the available berries.

In one configuration the separation system collects at least 99% of the available berries.

In one configuration the separation system collects at least 99.5% of the available berries.

The term "comprising" as used in this specification means "consisting at least in part of". When interpreting statements in this specification which include that term, the features, prefaced by that term in each statement, all need to be present but other features can also be present. Related terms such as "comprise" and "comprised" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF DRAWINGS

The invention is further illustrated in the following embodiments described with reference to the accompanying drawings. The drawings are for the purpose of describing particular embodiments only, and are not intended to be limiting with respect to the above description.

DETAILED DESCRIPTION

Figure 1:
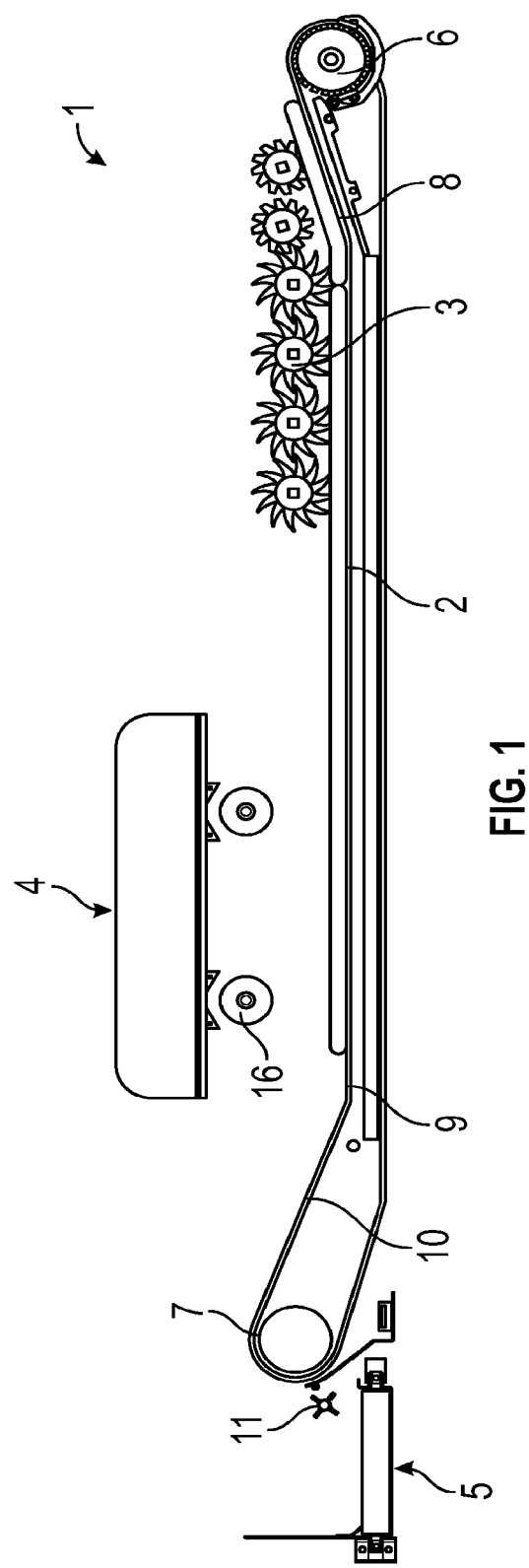
FIG. 1 is a schematic side view of a separation apparatus in accordance with an embodiment as described.

Described is a separation apparatus 1 for a harvester 20, for separating berries from other plant matter from harvested plant material. The separation apparatus 1 comprises a conveyor system that defines a first separation system 2 moveable to define an upstream and downstream position relative to the conveyor system, the conveyor system comprising a plurality of apertures to permit the transit of berries thereto, a second separator system 3 located above and/or adjacent the first separation system 2, the second separation system 3 comprising an array of rollers rotatable to convey harvested plant material in an upstream to downstream direction, the rollers spaced apart to provide a plurality of openings permitting the transit of separated berries through the openings while preventing the transit of other plant matter, and a third separation system 4 in the form of a de-stemming unit, downstream of the second separation system 3 and positioned above the first separation system 2, and wherein berries pass through any one or more of the first, second and third separation systems for collection in the collection unit. The separation apparatus may also comprise a plant matter distribution system 5, for distributing plant matter away from the apparatus and collection unit. The separation apparatus 1 may be fitted to a side arm of a harvester 20, or a collection unit.

In one embodiment the side arm and the separation apparatus 1 may be a unitary construction.

A harvester side arm may be as described in Australian patent 2005201250, that is, it extends laterally from the harvester 20 and provides for the continuous discharge of the berry harvest to one side of the harvester 20. The berries are collected by the harvester 20 and are conveyed to the side arm, upon which they are separated from the plant matter by the separation apparatus 1 as described allowing the berries to be collected by a collection unit.

The separation apparatus 1 as described can be retrofitted to a side arm. This is not possible when similar devices are retrofitted to mechanical harvesters, which require considerable modification to integrate such separators. Such simplified modification results in decreased costs for fitting the present separation apparatus 1 compared separation systems designed for mechanical harvesters.

The separation apparatus 1 for separating berries from other plant matter from harvested plant material may be fitted to a harvester side arm, wherein the collection unit is not integrated, or a component of, a mechanical harvester.

The side arm and the separation apparatus 1 as described may be formed unitarily. That is, the separation apparatus 1 as described includes structural elements that make the collection apparatus self-supporting. In such an embodiment the side arm (incorporating the separation apparatus as described) is direct fixed to the harvester.

The separation apparatus 1 may be hydraulically powered. The hydraulic power may be provided by a hydraulic pump separate to the collection unit. The hydraulic pump may be part of a vehicle towing the collecting unit. The hydraulic pump may be provided by a tractor, truck or other vehicle towing the collection unit.

Any suitable collection unit is envisaged to be used in accordance with the present disclosure. The collection unit may be an open top collection unit. The separation apparatus 1 may be located or fitted above the open top of a collection unit. In these embodiments, separated berries fall into the collection unit from the apparatus. In some embodiments the berries fall directly into the collection unit from the separation apparatus.

By providing a second separation system 3 above the first separating conveyor system 2, berries separated by the second separation system 3 can be fed to the first separating conveyor system 2 for further separation. Furthermore, other matter, which may include berries still attached to stalks or in bunches, sits on the mesh of the first separator system 2 and can be fed to the third separation system 4, being the de-stemming unit.

The fourth separation system 5, in combination with a de-stemming unit 4, can then transport other plant matter away from the collection unit for disposal.

1. First Separation System

As shown in FIG. 1, there is provided a separation apparatus 1 for separating berries from other plant matter from harvested plant material. The separation apparatus 1 comprises a first separating conveyor system 2 comprising an array of rollers that form the second separation system 3. The first separating conveyor system 2 conveys harvested plant material in an upstream to downstream direction. The rollers of the second separation system 3 are spaced apart to provide a plurality of openings permitting the transit of separated berries through the openings while preventing the transit of other plant matter. Plant material that does not pass through the second separation system 3 are conveyed to the third separation system 4 (de-stemming unit).

The first separating conveyor system 2 can be provided by any suitable conveying system that includes a plurality of openings for berries to pass through while retaining and conveying larger matter.

In some embodiments, the first separating conveyor system 2 is provided by a mesh or grate providing the plurality of openings. Movement of the mesh or grate can be provided by any suitable means, however in a preferred form the mesh or grate is provided by a continuous belt mounted to rotate around upstream 6 and downstream shafts 7. In some embodiments, the first separating conveyor system 2 is provided by a mesh providing the plurality of openings, wherein the mesh is a continuous mesh belt mounted to rotate around upstream 6 and downstream shafts 7.

In one embodiment the upstream shaft is an auger. The auger self-cleans the mesh of the conveyor system.

The orientation of the direction of travel of the first separating conveyor system is such that plant material conveyed along the first separating conveyor is fed into the third separation system 4 (the de-stemmer) for further separation.

The present disclosure may be vertically fitted above a collection unit such that berries, which transit through the openings of the first separating conveyor system 2, collect in the collection unit. Advantageously, in these embodiments, the apparatus is simplified such that it does not require any additional active transportation means for directing the separated berries into the collection unit. When fitted above the collection unit, the first separating conveyor system 2 of the apparatus sits above the collection unit. Consequently, separated berries fall directly into the collection unit from the first separating conveyor system 2.

Therefore, in at least some embodiments, the separation apparatus 1, when fitted above a collection unit, is configured such that the first separating conveyor system 2 is positioned above a collection unit such that berried or other matter that passes through the first separating conveyor system can be collected.

In some embodiments, the first separating conveyor system 2 is vertical axially aligned above the collection unit, such that berries that pass through the first separating conveyor system 2 are collected in the collection unit.

In some embodiments the separation apparatus 1 is mounted to extend longitudinally along the collection unit.

In some embodiments, the downstream end of the first separating conveyor system 2 extends beyond the periphery of the unit; thereby other plant matter is transported beyond the collection unit for disposal.

Figure 2:
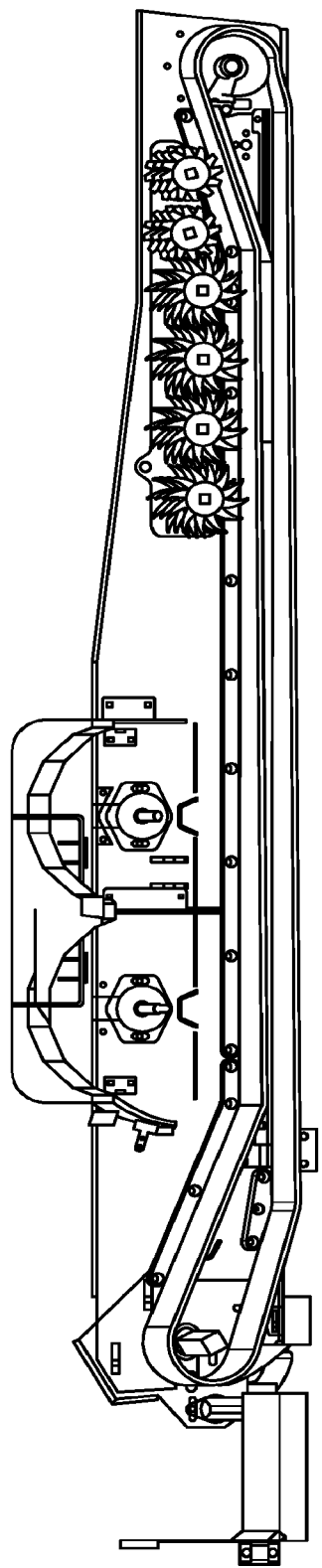
FIG. 2 is a cross-section side perspective view of the first separating conveyor system illustrated in FIG. 1.

As shown in FIGS. 1 and 2 the first separation conveyor system 2 may comprise one or more ramped zones. For example, the first separation conveyor system 2 may include a ramped first zone at the upstream portion of the first separation conveyor system 2. The ramped first zone 8 may slope down to an intermediate zone 9 of the first separation conveyor system 2, the intermediate zone 9 being substantially level. The first separation conveyor system 2 may include a ramped second zone 10 that slopes up from the intermediate zone 9 at the downstream end of the first separation conveyor system 2.

The first separating conveyor system 2 can be any suitable system provided that it includes a series of openings size to permit transit of separated berries, while retaining other plant matter on top of the conveyor. The first separating conveyor system 2 is provided by a continuous mesh belt providing the plurality of openings. The mesh belt mounted to rotate around an upstream shaft 6 and a downstream shaft 7, which rotate to move the upper surface of the mesh belt in an upstream to downstream direction thereby transporting matter in the same direction.

Alternative means for providing the first separating conveyor system 2 include an array of rollers a continuous grate belt provided by a series of parallel bars interlined by flexible connectors, the belt rotated around a first and second shaft, or a vibrating mesh which is angled to direct other plant matter in a predefined direction and away from the collection unit.

The terms "upstream" and downstream" as used throughout this specification are not intended to be references to height or elevation of relative ends of the separating conveyor system 2. Rather the terms are intended to indicate the direction of movement of matter on the first separating conveyor system 2.

2. Second Separation System

As shown in FIGS. 1 and 2, the second separating system 3 may be positioned at, or near, the upstream end of the first separating conveyor system 2. In some embodiments, the second separation system 3 extends along a portion of the first separating conveyor system 2.

Berries can be provided to the second separation system 3 of the separation apparatus 1 by any suitable means. Typically, a mechanical harvester has a discharge arm which is positioned to the side or rearward of the mechanical harvester 20. As such, the discharge arm can direct harvested plant material onto the second separation system 2 at the upstream end of the first separating conveyor system 2, which is subsequently transported to the downstream end of the first separating conveyor system 2 and into the third separating conveyor system 4. The separation apparatus 1 as described and shown in FIGS. 8 and 9 may further comprise a hopper 15 for receiving harvested plant material and directing it to the second separation system 3 at an upstream end of the first separating conveyor system 2. In some embodiments, the hopper 15 is provided by an inverted frustum shaped funnel.

Figure 3:
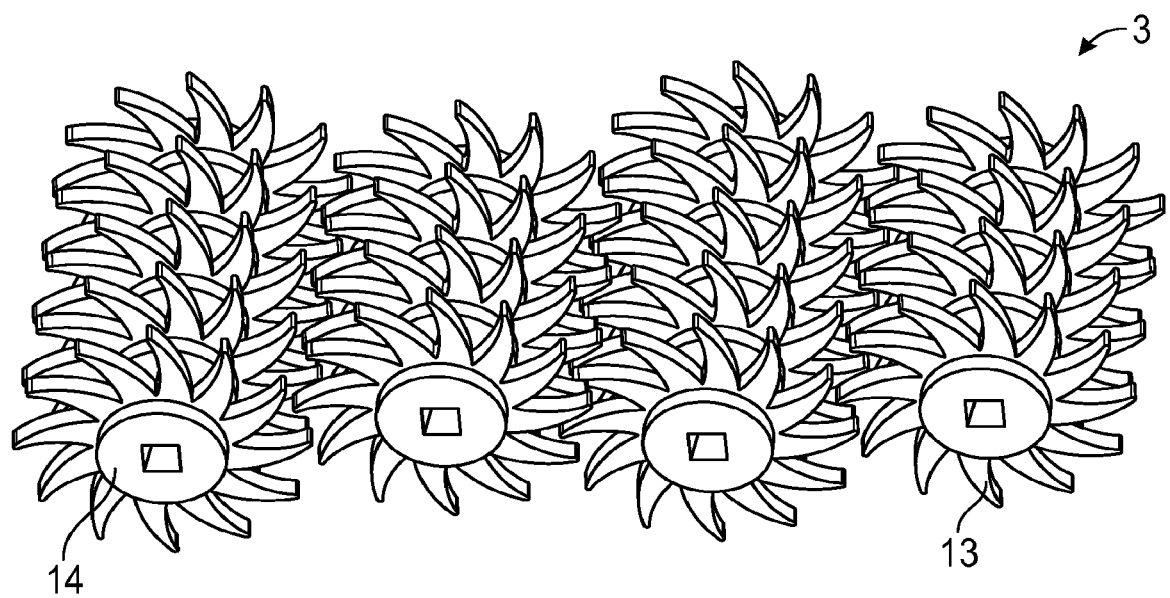
FIG. 3 is an enlarged view of the second separation system illustrated in FIG. 1.

The harvested plant matter deposited onto the second separation system 3 is substantially separated into berries and other plant matter by the rotating rollers of the second separation system 3. The rotating rollers of the second separation system 3 may comprise star shaped fingers as shown in FIG. 3.

Despite passing through or over the second separation system 3, some berries may still be attached to other plant matter, such as stalks, when they are deposited onto the first separating conveyor system 2. The separation system may further comprise a third separation system 4 (a de-stemming unit). The de-stemming unit 4 assists in further separating the berries from the other plant matter.

Figure 5:
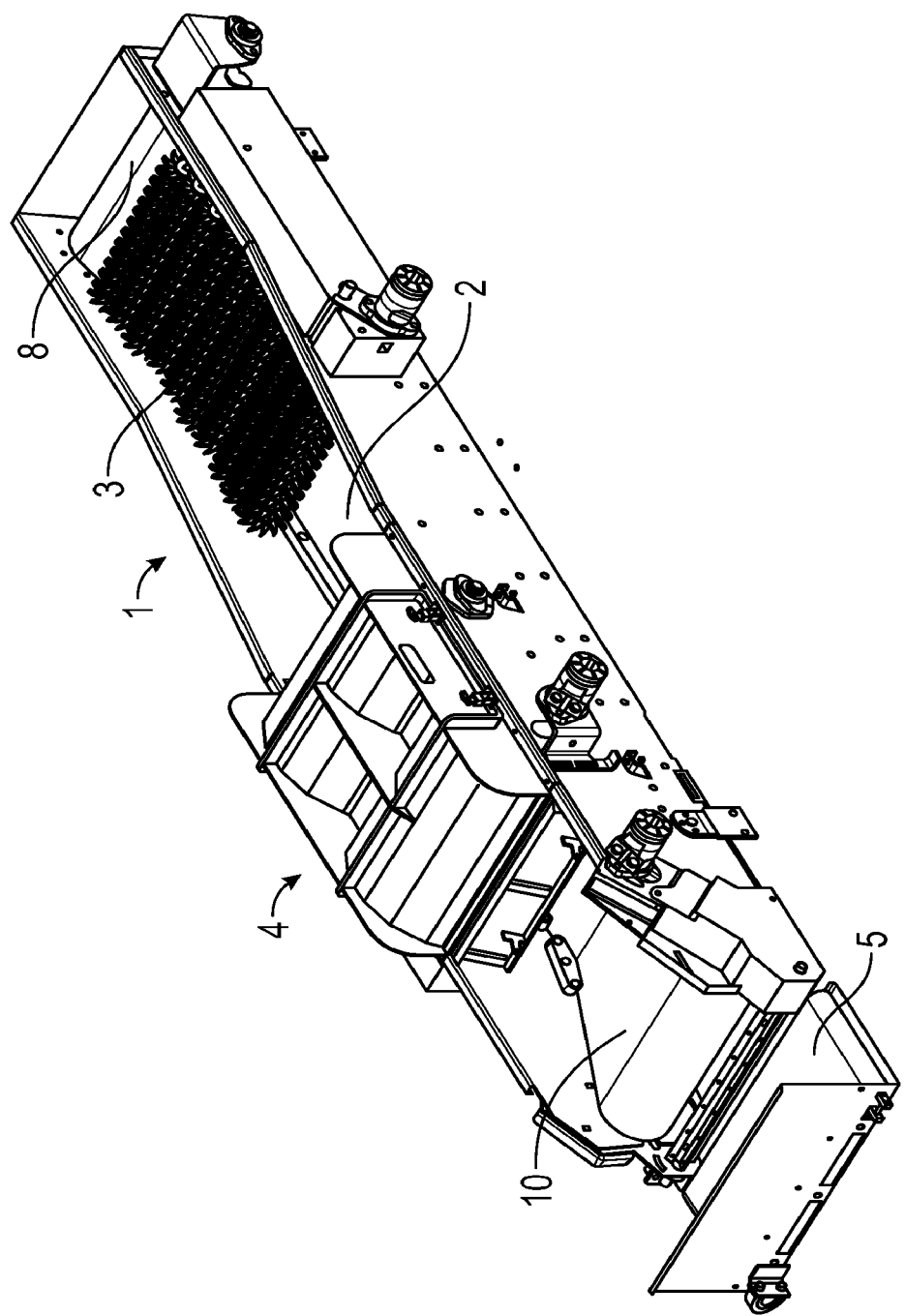
FIG. 5 is a perspective view of a separation apparatus in accordance with an embodiment as described.

As shown in FIG. 5, the second separator system 3 may locate about the ramped first zone 8 and intermediate zone 9. That is, the second separator system 3 may extend above a portion of the ramped first zone 8 and a portion of the intermediate zone 9 adjacent the ramped first zone 8.

Figure 6:
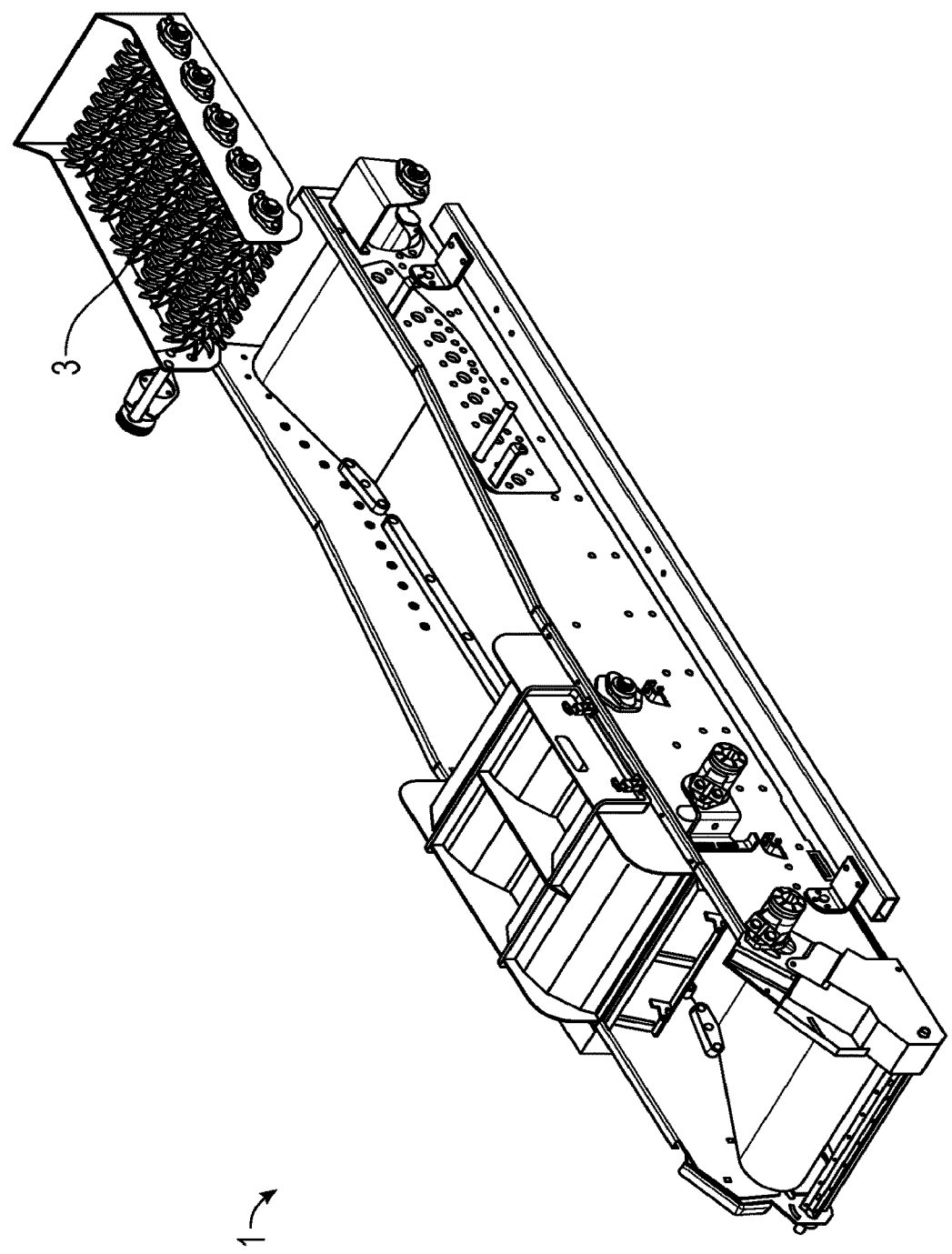
FIG. 6 is a perspective view of a separation apparatus in accordance with an embodiment as described where the second separator system is located outside the first separator conveyor system.

As shown in FIG. 6 the second separator system 3 may be located at least partially outside the upstream end of the first separator conveyor system 2. This may provide for a higher throughput of material since it reduces the amount of material that passes to the first separation conveyor system 2. For example, the harvested material falls on to the second separator system 3 and individual grapes pass through the second separator system 3. Any remaining material still attached to plant material passes to the first separator conveyor system 2. In some embodiments this may reduce the amount of material that is first moved to the first separator conveyor system 2 by about 20 to about 40% due to the amount of berries that pass through the second separator system 3. That is, the separation system 1 as shown FIG. 6 may have a throughput for about, 20, 25, 40 or 45 tons per hour, and suitable ranges may be selected from between any of these values (for example, about 20 to about 45, about 20 to about 40, about 20 to about 35, about 25 to about 45, about 25 to about 40, about 25 to about 35, about 30 to about 45 or about 30 to about 40 tons per hour). Thus the first and second separation systems of the separation system 1 as shown in FIG. 6 sit above the collection unit. The plant matter that passes above the second separation unit 3 may exit on to the ramped first zone 8.

Figure 7:
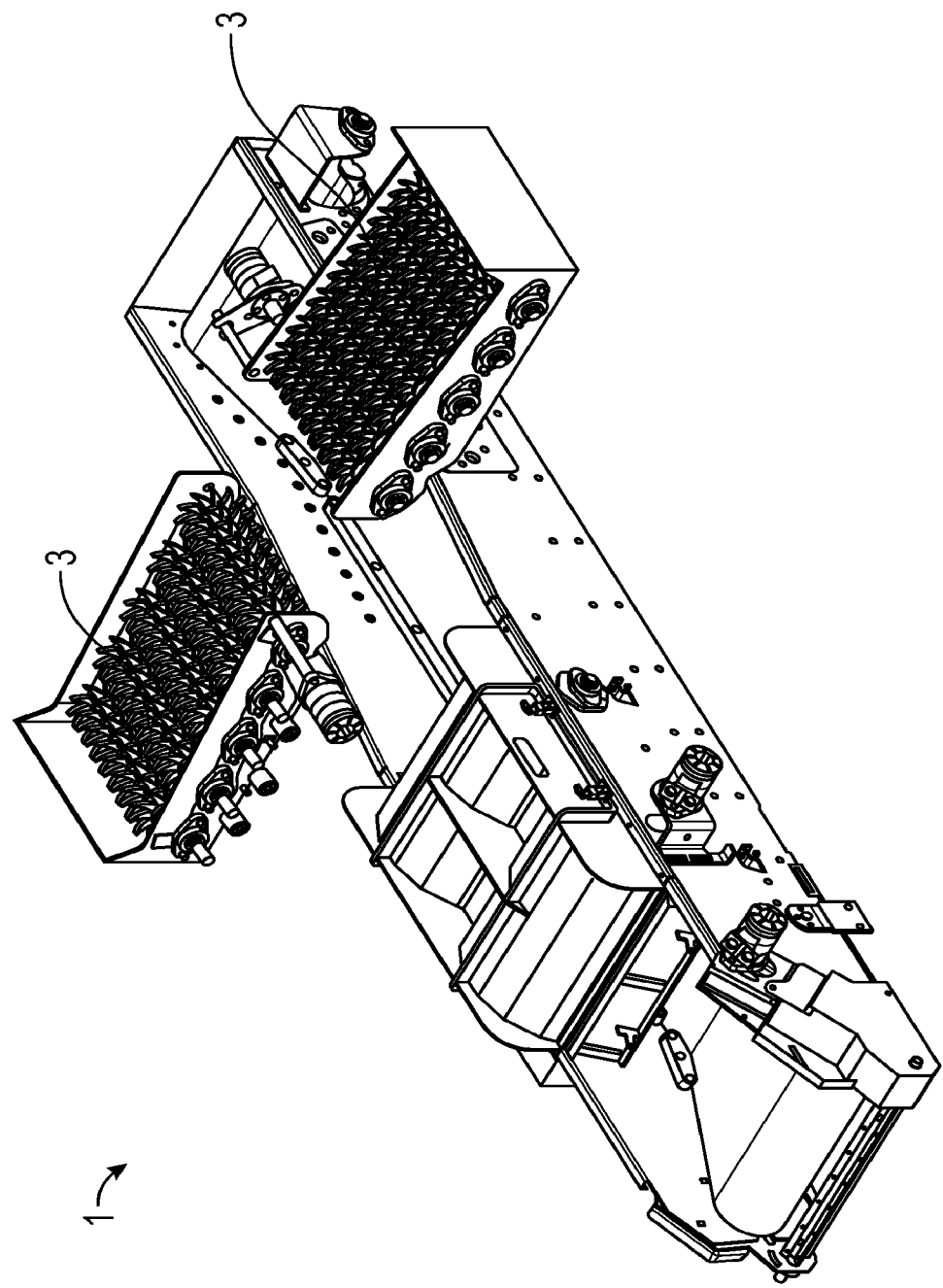
FIG. 7 is a perspective view of a separation apparatus in accordance with another embodiment as described where two second separator systems are located outside the first separator conveyor system.

As shown in FIG. 7 the second separator system 3 may be located at least partially outside the bounds of the first separator conveyor system 2. For example, the second separator system 3 may be located to a side of the first separator conveyor system 2. Alternately, the second separator system 3 may be located to both sides of the first separator conveyor system 2. The rollers of the second separator system 3 may have an axis of rotation that is aligned to the longitudinal axis of the first separator conveyor system 2 such that the rotational direction of the stars is perpendicular to the longitudinal axis of the first separator conveyor system 2 to thereby convey material that falls upon the second separator system 3 to the first separator conveyor system 2. The second separator system 3 may be located adjacent the upstream portion of the first separator conveyor system 2. The second separator system 3 may be located adjacent the ramped first zone 8 and/or the upstream intermediate zone 9 of the first separator conveyor system 2. The separator system 1 as shown in FIG. 7 may provide for a higher throughput of material since it reduces the amount of material that passes to the first separation conveyor system 2. For example, the harvested material falls on to the second separator system 3 and individual grapes pass through the second separator system 3. Any remaining material still attached to plant material passes to the first separator conveyor system 2. In some embodiments this may reduce the amount of material that is first moved to the first separator conveyor system 2 by about 20 to about 40% due to the amount of berries that pass through the second separator system 3. That is, the separation system 1 as shown FIG. 6 may have a throughput for about, 20, 25, 40 or 45 tons per hour, and suitable ranges may be selected from between any of these values (for example, about 20 to about 45, about 20 to about 40, about 20 to about 35, about 25 to about 45, about 25 to about 40, about 25 to about 35, about 30 to about 45 or about 30 to about 40 tons per hour). Thus the first and second separation systems of the separation system 1 as shown in FIG. 7 sit above the collection unit. The second separator system 3 of FIG. 7 may sit within the harvester.

Figure 10:
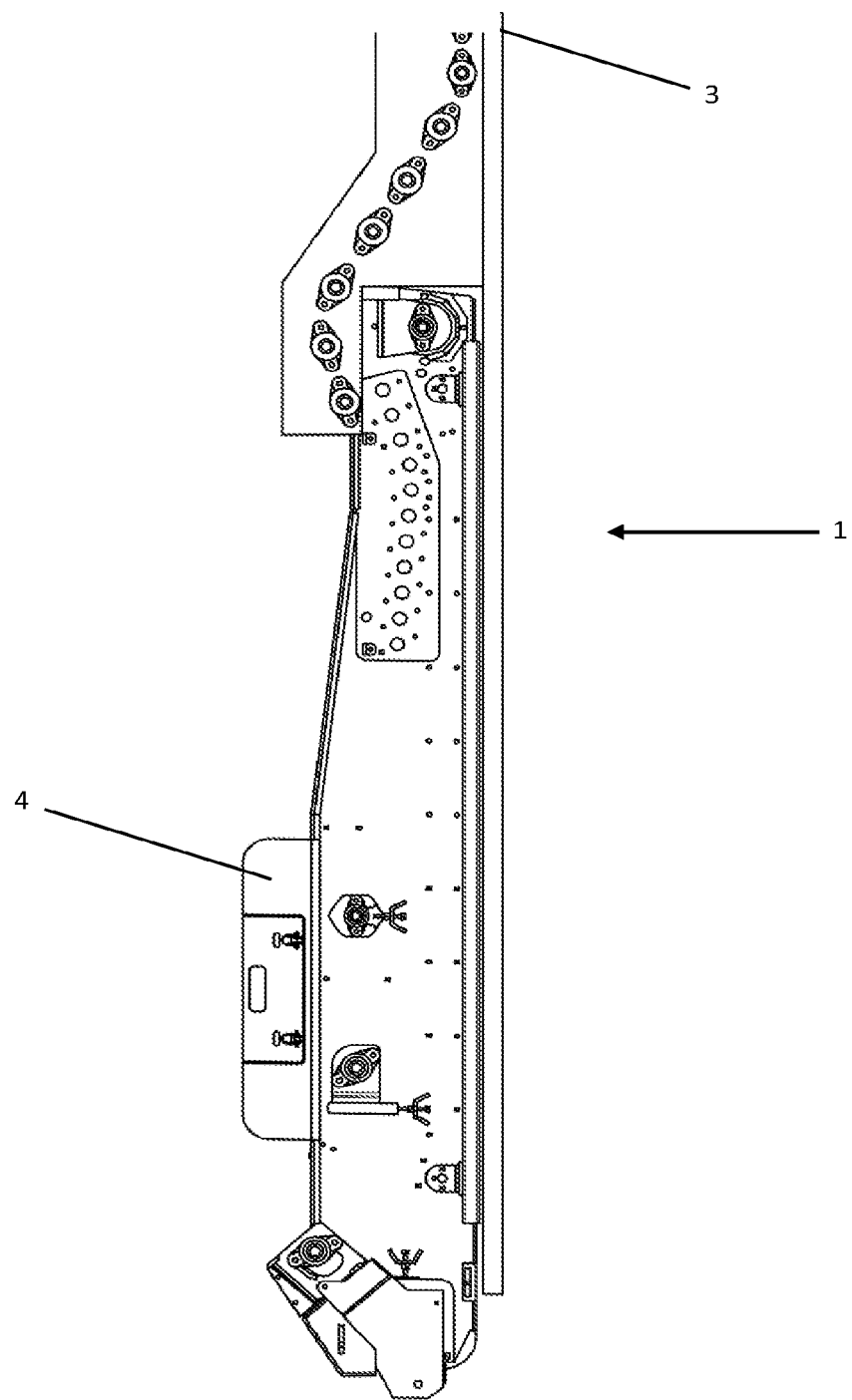
FIG. 10 is a cross section side view of the separation apparatus illustrated in FIG. 6 with a different second separator system, with a significant portion of the second separator system located outside of the first separator system.

As shown in FIG. 10, the second separator system 3 may be located at least partially outside the bounds of the first separator conveyor system 2 and comprise an incline (or gradient). The rollers of the second separator system 3 may be arranged to form an incline that increases in an upstream to downstream direction. In this embodiment, harvested material that falls upon the second separator system 3 is conveyed up the incline of the second separator system 3 before being deposited on the first separating conveyor system 2. Without being limited by theory, the ramped section may impart more work on the berries as they need to work their way up the ramped section against gravity, thus enabling more MOG to be separated by the berries and a greater proportion of berries to pass through. The incline reduces the amount of harvested material that are still attached to other plant matter that is conveyed onto the first separating conveyor system 2. In some embodiments, the incline of the second separator system 3 may comprise an angle of about −45°, −40°, −35°, −30°, −25°, −20°, −15°, −10°, −5°, −4°, −3°, −2°, −1°, 0°, 1°, 2°, 3°, 4°, 5°, 10°, 15°, 20°, 25°, 30°, 35°, 40° or 45°. In some embodiments, the angle of the incline may vary along the length of the second separator system 3. For example, an upstream portion of the second separator system 3 may comprise an angle of 0° which transitions to middle portion with an angle of 20° and a downstream portion with an angle of −10°.

In some embodiments 5, 10, 15, 20, 25, 20, 25, 40, 45 or 50% of the second separator system 3 may be located above the first separator conveyor system 2, and useful ranges may be selected between any of these values (for example, about 5 to about 50, about 5 to about 30, about 5 to about 20, about 10 to about 50, about 10 to about 40, about 10 to about 30, about 15 to about 50, about 15 to about 45, about 15 to about 35, about 20 to about 50, about 20 to about 40, about 25 to about 50 or about 25 to about 40%).

As mentioned the rollers of the second separation system 3 substantially act to remove berries which are still attached to other plant matter. However, some berries may still be deposited onto the first conveyor system 2 attached to other plant matter, or still in bunches. Therefore, as shown in the figures the separation apparatus 1, further comprises a third separation system 4 (de-stemming unit).

2.1 Rollers

As shown in FIG. 3 the second separator system 3 may comprise a series of rollers with radially-extending fingers 13. The shafts 14 of the rollers may be spaced along a plane at an orientation and distance relative to one or more adjacent shafts 14 such that a radially-extending roller on a shaft 14 extends into a space provided between two adjacent radially-extending rollers on an adjacent shaft 14 to provide an array of rollers and a plurality of openings 6.

The array of rollers of the second separation system 3 is provided by a series of shafts 14, each shaft provided with a plurality of spaced apart radially-extending rollers, wherein the shafts 14 are spaced along a plane at an orientation and distance relative to one or more adjacent shafts such that a radially-extending roller on a shaft extends into a space provided between two adjacent radially-extending rollers on an adjacent shaft to provide an array of rollers and a plurality of openings.

In some forms of the above embodiments, the radially-extending rollers are provided by multiple projections 13 radially-extending from the shaft 14 to define the roller, wherein the radially-extending rollers are disposed perpendicular to the shaft.

The radially-extending projections 13 can take any form, and be formed of any suitable material. However, in some embodiments the radially-extending projections 13 extend from the shaft in an arc away from the direction of rotation of the radially-extending rollers. Such an arrangement is referred to as a 'star wheel'. Preferred materials for formation of the radially-extending projections include flexible polymers such as rubber, or other suitable food safe synthetic or natural polymers.

The radially-extending rollers are provided by multiple projections 13 radially-extending from a shaft 14 to define the roller, wherein the rollers are disposed perpendicular to the shaft 14. Each of the radially-extending projections 15 extends from the shaft 14 in an arc away from the direction of rotation see arrow of the rollers, to provide a 'star wheel'. The radially-extending projections 15 are preferably made out of flexible material, such as a flexible polymer like rubber. However, other suitable food safe materials can be used. While star wheels are used in the illustrated embodiment of the invention, other suitable roller may be attached to the shafts 14 to provide the required openings through which berries can pass. Additional means for providing separating conveyor systems are known in the art such as the Selectiv' Process Winery™ table by Pellenc™ which provides a series of parallel rollers which oscillate in thickness along their length such that gaps are provided between the rollers for berries to pass through, while waste plant matter is retained and rolled off the top of the rollers.

In some embodiments, the distance provided between adjacent rollers on the same shaft 14 is between 30 mm and 60 mm, preferably between 40 mm and 50 mm, or more preferably the distance is approximately 45 mm. As will be understood, the space between the rollers may need to be adjusted depending on the berries being picked. Therefore, in some embodiments the distance provided between adjacent rollers on the same shaft can be adjusted. In some embodiments, the second separator conveyor system 3 includes a mechanism for adjusting the distance provided between adjacent rollers on the same shaft 14.

In some embodiments, each shaft 14 is provided with between 3 and 9 rollers, in some embodiments, each shaft 14 is provided with between 5 and 7 rollers. In some embodiments, each shaft 14 is provided with 6 rollers.

In some embodiments, each shaft 14 is positioned between 200 mm and 100 mm apart, preferably 180 mm to 120 mm apart, or 165 mm to 135 mm apart. In yet a further embodiment, the shafts 14 are spaced approximately 150 mm apart on the frame 16. As will be understood the distance between the shafts 14 may be altered when there is a need to use small or larger rollers. Furthermore, the distance between the shafts 14 may be altered if the incline of the first separating conveyor is increased or decreased.

In some embodiments, each roller has a cross-sectional length of between 200 mm and 120 mm, preferably 180 mm to 140 mm. In yet a further preferred embodiment, the length of the roller is 160 mm. In embodiments wherein the rollers have a circular cross section, the diameter of the roller will be 160 mm. However, as will be understood the cross-sectional length of the rollers can be altered to optimize the performance of the separation systems 1. Such alterations may be made in consideration of the berries to be separated.

In one embodiment, the drop zone for the harvested material is over the rollers of the third downstream shaft.

In some embodiments, the width of the rollers is between 16 mm and 10 mm, preferably between 14 mm and 12 mm. In some embodiments, the width of the rollers is approximately 13 mm. As will be understood, the width of the rollers can be altered to optimize the performance of the first separating conveyor system, and may be altered depending on the spacing between adjacent rollers on the same shaft 14.

The shafts 14 may be mounted to a frame, which securely locate the shafts 14 to permit rotational movement, without translational movement. The orientation of the plane defined by the series of shafts 14 may be inclined relating to horizontal or relative to the first separating conveyor system 2. The preferred incline of the second separating conveyor system 3 can be influenced by the type of grapes or berry being processed. The incline may be at an angle of about 20°, relative to horizontal or the first separating conveyor system 2. It may be desirable to include a mechanism for adjusting the incline of the second separating conveyor system 3 such that the angle is maintained at 20 degrees relative to level.

3. Third Separation System

As described above, the separation apparatus 1 may comprise a third separation system 4 (in the form of a de-stemming units). The de-stemming unit 4 can puncture berries during the process of de-stemming and therefore release the juice from the berries. In hot conditions this juice can begin to ferment while in the collection unit which is undesirable. Therefore, to minimise the number of berries that feed into the de-stemming unit 4, in some embodiments, the de-stemming unit 4 is positioned at or near the downstream end of the first separating conveyor 2. This results in only the minimal amount of berries entering the de-stemming unit 4 as the majority of separated berries have already passed through the first 2 and second 3 separating conveyor systems.

De-stemming units 4 suitable for use are known in the art. However, in some embodiments, the de-stemming unit 4 is provided by a series of rotating fingers provided on a shaft, which rotate to dislodge the berries from other plant matter. In some embodiments, the rotating fingers of the de-stemming unit 4 are positioned above the first separating conveyor 2 and rotate in a direction opposite the travel of plant material on the first separating conveyor 2.

An alternative de-stemming unit 4 includes a rotatable cylinder having a plurality of apertures configured to permit berries to pass through. The cylinder has a coaxial shaft which extends along at least a portion of the length of the cylinder, the shaft having a plurality of projecting members that radially extend toward the periphery of the cylinder. The radially-extending projecting members are arranged to form a helix, such that when the shaft is rotated the projecting members direct waste along the length of the cylinder and propel waste matter out of an open end of the cylinder, opposite the end to which the waste matter was provided. In this embodiment, the cylinder of the de-stemmer would be positioned above the collection unit, such that berries that pass through the apertures of the first separating conveyor system 2 from the de-stemming unit 4 are collected in the collection unit.

De-stemming units 4 are known in the art and act to remove the stems still attached to berries. The de-stemming unit may be provided by a series of rotating fingers, provided on a shaft, which rotate to dislodge berries from other plant matter transported on the first separating conveyor system 2. Dislodged berries then pass through the openings in the first separating conveyor system 2 and are collected in the collecting unit. The de-stemming unit 4 is positioned at or near the downstream end of the first separating conveyor 2, with the rotating fingers positioned above the first separating conveyor 2 and rotating in a direction opposite the travel of plant material on the first separating conveyor 2.

Alternative de-stemmers are known in the art and can be included in the separation apparatus 1 of the present invention. One non-limiting example of a de-stemming unit suitable for use in the present invention may comprise a rotatable cylinder having a plurality of apertures configured to permit berries to pass through. The cylinder has a coaxial shaft which extends along at least a portion of the length of the cylinder, the shaft having a plurality of projecting members that radially extend toward the periphery of the cylinder. The radially-extending projecting members are arranged to form a helix, such that when the shaft is rotated the projecting members direct waste along the length of the cylinder and will propel waste matter out of an open end of the cylinder. In this embodiment, the cylinder of the de-stemmer would be positioned above the collection unit, such that berries that pass through the apertures are collected in the collection unit.

Where the de-stemmer unit 4 is provided by a series of rotating fingers, the unit comprises at least two separate shafts of rotating fingers. The rotating fingers of the upstream shaft may sit 10, 11, 12, 13, 14, 15, 16, 17, 18, 19 or 20 mm above the belt of the first separating unit, and useful ranges may be selected in between any of these values. The rotating fingers of the second de-stemmer shaft may sit about 1, 2, 3, 4 or 5 mm above the belt of the first separating unit, and useful ranges may be selected in between any of these values.

The rotary de-stemmer may comprise two shafts of rotating fingers only.

The upstream shaft may rotate about 20, 25, 30 or 35% faster than the downstream shaft, and useful ranges may be selected in between any of these values.

4. Plant Matter (MOG) Distribution System

Once through the third separation system 4 (the de-stemmer) the first separating conveyor system may feed the waste plant material to the plant matter distribution system 5.

In some embodiments as described, when fitted above a collection unit, the plant matter distribution system 5 extends beyond the collection unit thereby transporting the waste plant matter beyond the collection unit. The waste plant matter is therefore disposed of. In some embodiments, the waste plant matter is disposed of by depositing on the ground. Alternative waste matter collection systems may be used.

Figure 4:
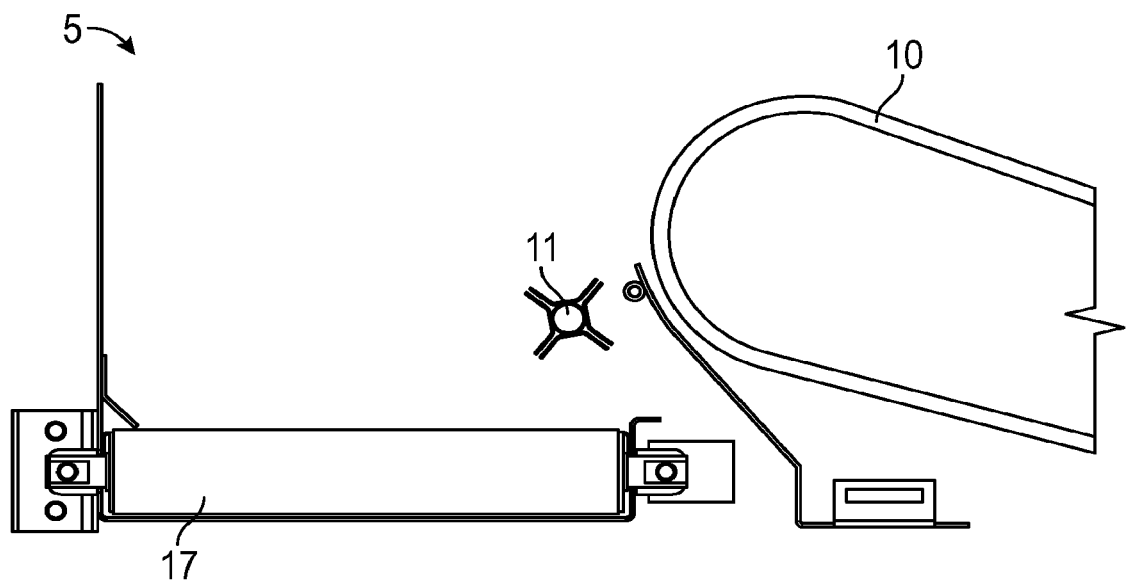
FIG. 4 is an enlarged view of the plant matter distribution system illustrated in FIG. 1.

In some embodiments the separation system 1 includes a plant matter distribution system 5 as shown in FIG. 4 positioned downstream of the third separation system 4 for distributing plant matter away from the separation apparatus 1. The plant matter distribution system 5 receives plant matter from the first separation conveyor system 2 and removes the plant matter from the separation apparatus 1. The matter distribution system 5 could be in the form of a conveyor system oriented substantially perpendicular to the longitudinal axis of the first separation conveyor system 2. That is, the plant material will be distributed to the side of the separation system 1. The plant matter distribution system 5 may extend below the downstream end of the first conveyor separation system 2 so as to overlap to a degree. This may assist in reducing or preventing the plant matter from being collected.

In one embodiment the plant matter distribution system 5 may form a continuous conveyer belt around the discharge boom. That is, the plant matter distribution system 5 may encircle the main frame of the discharge boom. Without wishing to be limited by theory, this may help prevent or reduce a build-up of plant matter that can occur over time in the gaps around the plant matter distribution system 5. The plant matter distribution system 5 may sit just above the conveyer of the discharge boom, for example, the plant matter distribution system 5 may sit about 10, 15, 20, 25 or 30 mm above the conveyer of the discharge boom.

The plant matter distribution system 5 may be a rotatable platform that rotates about a vertical axis having one or more baffles that extend above the surface of the rotatable platform.

The separation apparatus 1 may include a rotatable shaft 11 at the downstream end of the first conveyor separations system 2. The rotatable shaft 11 may be located between the first conveyor separation system 2 and the plant matter distribution system 5. The rotatable shaft 11 may comprise one or more baffles that extend along the axis of the rotatable shaft 11. Thus the shaft may rotate counter clockwise relative to the orientation of FIG. 4 to assist the passage of plant material to the plant matter distribution system 5.

5. Collection Unit

In some embodiments, the collection unit is a trailing collection unit, and/or does not form part of a harvesting apparatus nor is it integrated with a vehicle for harvesting. In some embodiments, the collection unit is a detachable and towable collection unit.

In one embodiment, as described is a collection unit having a separating apparatus as described. In some embodiments, the collection unit is provided by a collection bin on a collection trailer. In this form, the collection unit may be known as a trailer bin or a chaser bin.

The collection unit may sit below the side arm, or may be located to one end of the side arm.

Typically, two types of towable collections units are used in combination with mechanical harvesters. The first type are referred to as tailer bins, or chaser bins, which are towed beside the grape harvester typically by a tractor. These collection units normally have removable, relatively small, collection bins mounted, or positioned, on a frame. Once full, the collection bins can be removed and left behind for processing of the berries. In the field of winemaking this has the advantage that the grape are minimally disturbed, and aeration is reduced, so unwanted juice production and fermentation in the collection bins is minimised. The second type of commonly used, open top, collection unit is referred to as a gondola. A gondola is typically used for bulk harvests e.g. 3 to 7 tonnes and comprises a large tippable bin towed on a heavy duty chassis by a vehicle such as a tractor. Once full, the gondola can tip the harvested berries into a truck which transports them to a processing facility, such as a winery, or the gondola can transport the berries to the processing facility itself. Both of these common types of collection units are envisaged to be used in embodiments of the present invention Collection units, unlike mechanical harvesters, are often owned by the property from which the berries are harvested, such as a vineyard. Therefore, a property owner, who directly benefits from increased returns that result from lower contamination levels in harvested berries, can fit the apparatus to the harvester side arm or to their collection units, and can purify the harvested berries irrespective of the mechanical harvester used. This provides greater flexibility to the property owner and allows them to decrease the likelihood of being penalised for elevated contamination levels in their harvested berries.

The collection unit may be a trailing collecting unit to be towed in coordination with an operating mechanical harvester. In some embodiments, the collection unit is a chaser bin or a gondola to be towed by another vehicle alongside the mechanical harvester. Suitable vehicles include tractors.

The collection unit as described may be separate to the mechanical harvester. The first, second, third and fourth (if present) separators may need to be powered for operation. As such, in some embodiments, the separation systems are powered by hydraulics. In some embodiments, the hydraulic power is provided by a hydraulic pump separate to the collection trailer. In some embodiments, the hydraulic pump is provided on the vehicle towing the collection unit, and the collection unit is in fluid communication with the hydraulic pump.

The berries may be grapes and the other plant matter is material other than grapes MOG. As would be understood MOG includes, but is not limited to: leaves, petioles, stalks, canes, wood, non-vine plant matter e.g. leaves from surrounding trees, pests e.g. snails, caterpillars, rodents and foreign objects e.g. irrigation parts, trellis parts and debris.

The separation apparatus 1 as described can be used with other fruit, with some degree of modification. For example, the sizing of openings and components may need to be modified to permit use with other fruit, or indeed for specific varieties of grapes.

The separation apparatus 1 may be separate to the mechanical harvester. Therefore, the use of the separation apparatus 1 is independent of the type of harvester used and its implementation can be controlled by the owner of the property from which the berries are being harvested for example a vineyard.

In the embodiment of the separation apparatus 1, when oriented above a collection unit, the downstream end of the first separating conveyor system 2 extends beyond the collection bin, thereby transporting other plant matter retained on the second separating conveyor 3 beyond the collection unit.

The first separating conveyor system 2 may be located vertically above a collection unit, such that berries which transit through the openings of the mesh of the first separating conveyor system 2 are collected in the collection unit.

6. Method of Operation

Figure 11:
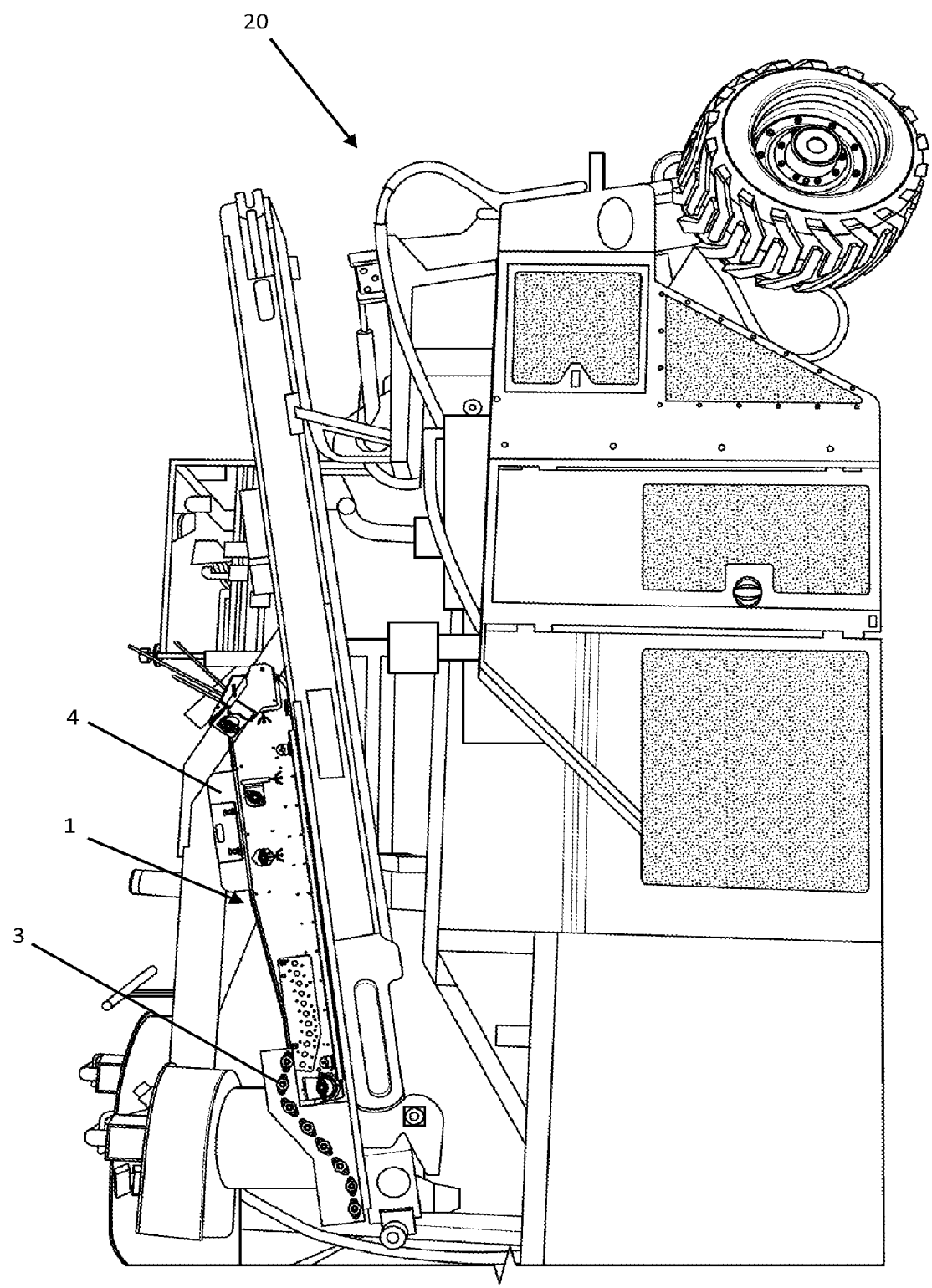
FIGS. 11 to 13 are side views of different harvester types provided with a separation apparatus of FIG. 10.
Figure 12:
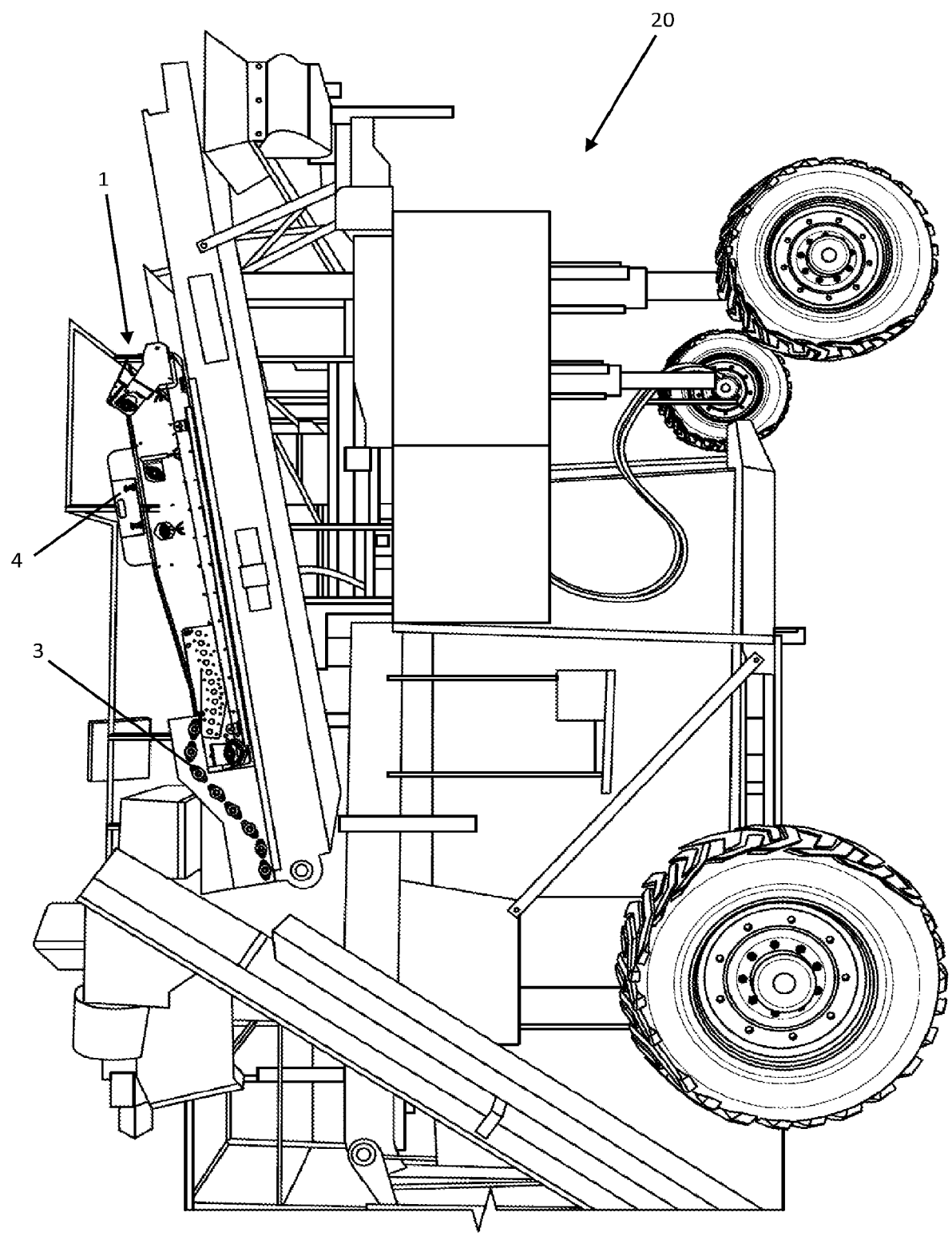
Figure 13:
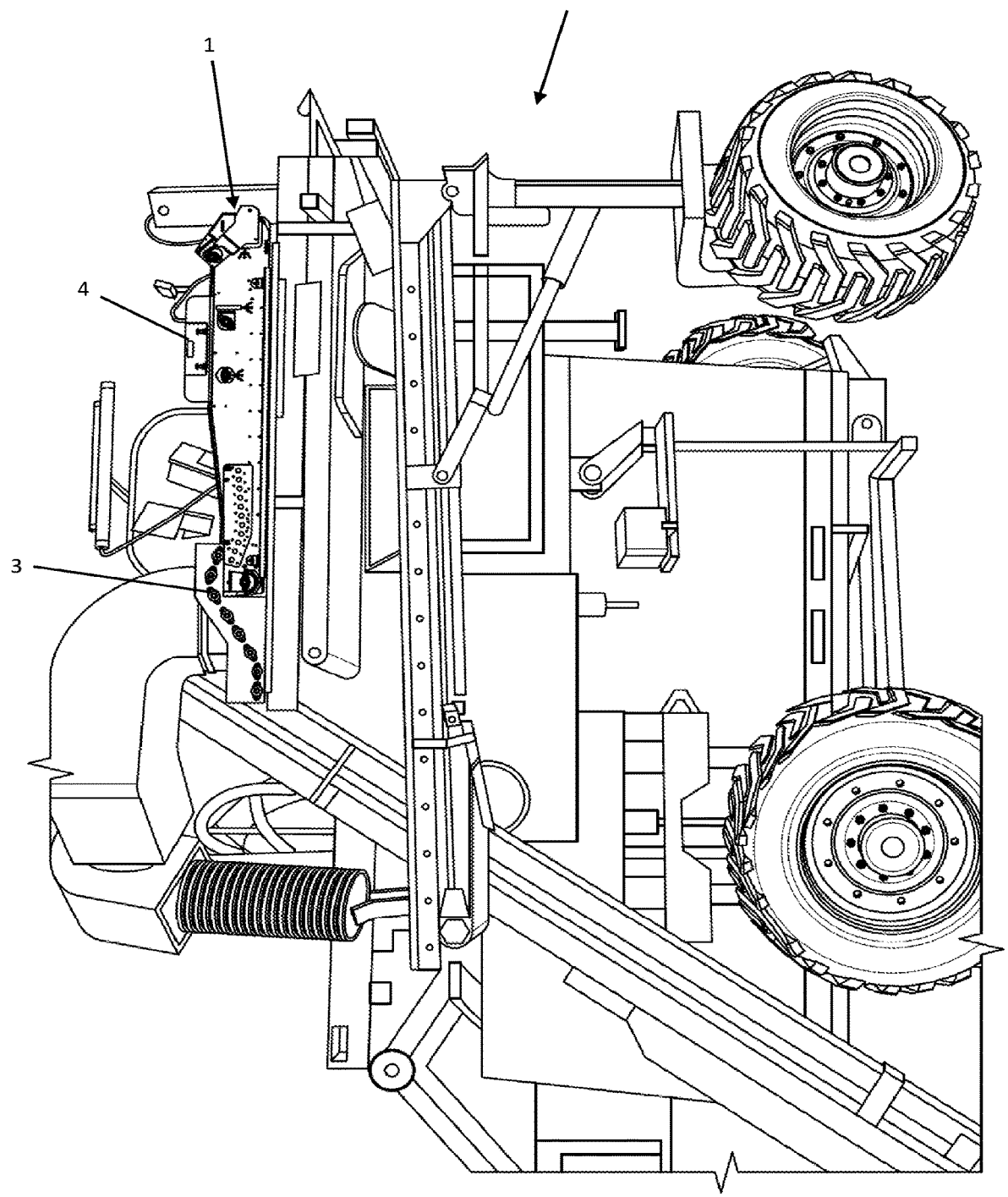

As shown in FIGS. 11 to 13, the separation apparatus 1 may be located on a harvester 20. The separation apparatus 1 may be located on a boom arm of the harvester 2 or above a distribution conveyer of the harvester 20.

Operation of the separation apparatus 1 as described requires movement of the first separating conveyor system 2, as well as the de-stemmer 4. Consequently, the separation apparatus 1 needs a supply of power. Any suitable power supply, which can provide rotational movement of the shafts of the second separation system 3 or de-stemmer 4 can be used. For example, the movement of the shafts may be effected by electrical motors connected to a suitable electrical power source. However, a preferred and convenient source of power is hydraulic power. The majority of tractors include hydraulic pumps which can be used to provide hydraulic power to the separation apparatus 1. Therefore, in some embodiments, the first separating conveyor system 2 is driven by hydraulics. Further, the de-stemmer 4 can also be driven by hydraulic power. In some embodiments, the hydraulics are provided by a hydraulic pump separate to the collection trailer not shown, such as a hydraulic pump on a towing vehicle.

Figure 8:
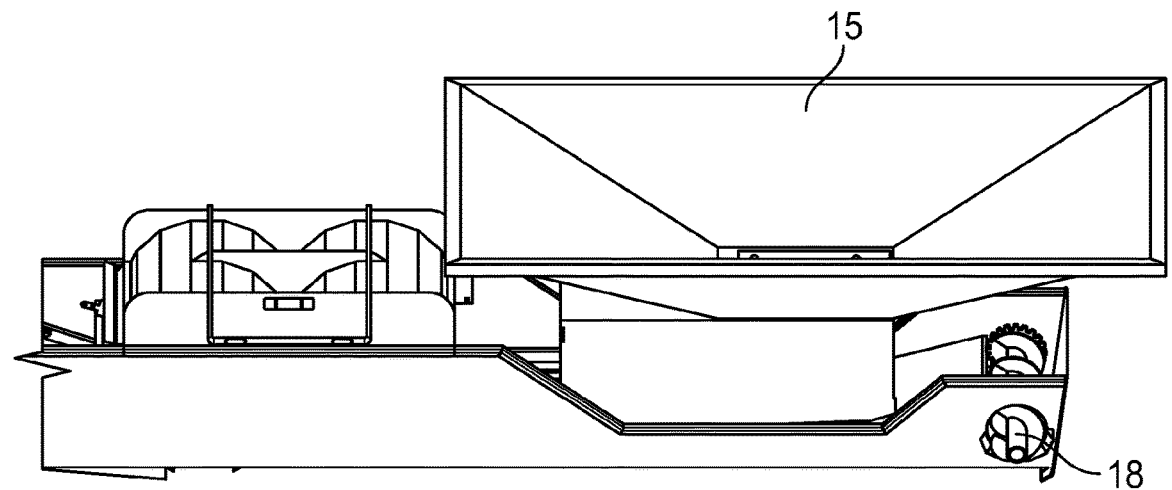
FIG. 8 is an enlarged side perspective view of a separation apparatus in accordance with an embodiment as described with a hopper provided over the second separator system.
Figure 9:
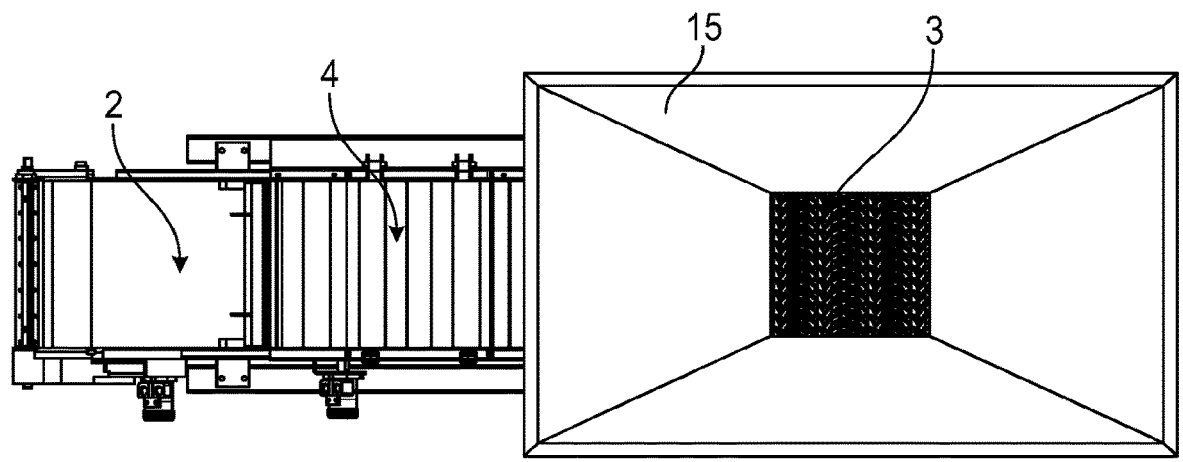
FIG. 9 is a plan view of a separation apparatus in accordance with an embodiment of as described with a hopper provided over the second separator system.

Once harvested the berries are distributed onto the separation apparatus 1 via a hopper. As seen in FIGS. 8 and 9 the hopper 15 sits above the second separation system 3 so that the berries fall on to the second separation system 3. As shown in FIGS. 11 and 12 the hoppers 15 may distribute the berries onto a ramped portion of the second separation system 3, the ramped portion of the second separation system 3 sitting outside of the first separating conveyor system 2. The berries then move from the second separation system 3 to the first separating conveyor system 2, although some berries will pass through the second separation system 3 and are collected into the storage hopper.

The separation system as described may separate berries from plant materials such that the amount of contaminating plant material (material other than grape [MOG]) is less than about 2, 1.5, 1.0, 0.9, 0.8, 0.7, 0.6, 0.5, 0.4, 0.3, 0.2 or 0.1% by weight of the collected material, and suitable ranges may be selected from between any of these values (for example, about 2 to about 0.1, about 2 to about 0.3, about 2 to about 0.5, about 2 to about 0.6, about 2 to about 0.7, about 2 to about 0.8, about 2 to about 1.0, about 1.5 to about 0.1, about 1.5 to about 0.3, about 1.5 to about 0.5, about 1.5 to about 0.6, about 1.5 to about 0.7, about 1.5 to about 0.8, about 1.5 to about 1.0, about 1.0 to about 0.1, about 1.0 to about 0.3, about 1.0 to about 0.5, about 1.0 to about 0.6, about 1.0 to about 0.7, about 1.0 to about 0.8, about 0.9 to about 0.1, about 0.9 to about 0.3, about 0.9 to about 0.5, about 0.9 to about 0.6% by weight).

The separation system as described may collect at least 95, 96, 97, 98, 99 or 99.5% of the available berries, and suitable ranges may be selected from between any of these values.

In one embodiment the separation apparatus as described processes up to 30, 35 or 40 tons per hour, and useful ranges may be selected in between any of these values.

7. Examples

Trials were conducted across several wine regions in Australia, harvesting wine grapes for three small wine producers as well as four large vertically integrated wine producers.

The purpose of the trials were to:
i) Measure and quantify the reduction in MOG using the above methods compared with no MOG removal capability in the vineyard. MOG was measured by weight as recorded at the winery, and then expressed as a percentage of the total harvest weight.
ii) Measure throughput by recording the speed of processing time at the winery for fruit harvested with no MOG removal, and with MOG removed using the separation apparatus of the invention.

iii) Compare processing side-by-side trials of grapes with MOG removed, and without MOG removed. Wine quality was to be measured with flavour and colour analysis from wine samples from red and white grapes.

Five trials were conducted to obtain data, each trial involved fruit being picked by harvesters without any selective harvesting capabilities. Fruit harvest was split evenly using two methods, one with fruit being picked straight into the grape bins (with no MOG removed) and the second being harvested by the same harvester, but using the separation apparatus of the invention. Method of transportation (i.e. standard 2.5T polyethylene or steel grape bins loaded onto B-double trucks) and transportation times were consistent for both samples.

Raw samples (containing MOG) and the MOG-free samples were processed separately at the winery. MOG removed at the crusher was weighed for both samples and recorded for each delivery of fruit. Where possible the time taken to crush the loads was recorded. Several processing sites did not have variable speed crushing facilities, and the only means of analysing throughput was to record the number and approximate time of stoppages caused by MOG. The MOG grade as determined by visual inspection at the winery weighbridge was recorded for each sample.

Table 1 shows percentage MOG, and winery throughput (tonnes per minute) between unsorted samples and samples sorted using separation apparatus of the claimed invention.

The results in Table 1 demonstrate that samples sorted using separation apparatus of the present invention reduces MOG by up to 68 times when compared to unsorted samples. The results of trial 2 also demonstrate that winery throughput is also increased when sorted using separation apparatus of the present invention.

The description provided herein is in relation to several embodiments which may share common characteristics and features. It is to be understood that one or more features of one embodiment may be combinable with one or more features of the other embodiments. In addition, a single feature or combination of features of the embodiments may constitute additional embodiments.

Those skilled in the art will appreciate that the invention described herein is susceptible to variations and modifications other than those specifically described. It is to be understood that the invention includes all such variations and modifications. The invention also includes all of the features referred to, or indicated, in this specification, individually or collectively, and any and all combinations of any two or more of the features. Various alterations, additions and/or modifications may be made to the parts specifically described, without departing from the ambit of the present invention.

Also, it is to be noted that, as used herein, the singular forms "a", "an" and "the" include plural aspects unless the context already dictates otherwise.

The invention claimed is:

1. A separation apparatus for separating fruit from other plant matter from harvested plant material, the apparatus comprising:
a first separating conveyor system comprising a continuous belt mounted to rotate around an upstream shaft and a downstream shaft, the continuous belt of the first conveyor system including a plurality of openings configured to permit the transit of fruit therethrough while retaining other plant matter on the continuous belt;
a second separating conveyor system comprising a series of adjacent shafts having an array of rollers, the rollers rotatable to convey harvested plant material in an upstream to downstream direction and spaced apart to form a plurality of openings therebetween permitting the transit of separated fruit therethrough while preventing the transit of other plant matter, the second separating conveyor system comprising at least four shafts that are not located above the first separating conveyor system, such that transited fruit via the four shafts are collected and do not pass to the first separating conveyor system, and
a de-stemming unit positioned above the first separating conveyor system downstream of the first separating conveyor system.

2. The apparatus of claim 1, wherein the distance provided between adjacent rollers on the same shaft is between 30 mm and 60 mm.

3. The apparatus of claim 1, wherein the rollers are adapted to allow adjustment of the space between the rollers.

TABLE 1

Percentage MOG and winery throughput between unsorted and sorted samples

| | Trial 1 | | Trial 2 | | | Trial 3 | | Trial 4 | | Trial 5 | |
|---|---|---|---|---|---|---|---|---|---|---|---|
| | Un-sorted | Sorted with separation apparatus | Un-sorted | Sorted with separation apparatus 1 | Sorted with separation apparatus 2 | Un-sorted | Sorted with separation apparatus | Un-sorted | Sorted with separation apparatus | Un-sorted | Sorted with separation apparatus |
| Tonnes Picked | 87.02 | 163.92 | 10.88 | 9.38 | 21.74 | 9.67 | 9.37 | 8.83 | 10.08 | 36.12 | 36.12 |
| Tonnes MOG (recorded at winery) | 1.98 | 0.62 | 0.29 | 0.024 | 0.042 | 0.16 | 0.005 | 0.12 | 0.002 | 0.561 | 0.16 |
| % MOG | 2.28 | 0.38 | 2.66 | 0.26 | 0.19 | 1.65 | 0.05 | 1.36 | 0.02 | 1.55 | 0.44 |
| MOG Grade | 3 | 0 | 3 | 0 | 0 | 2 | 0 | NA | NA | 1 | 0 |
| Winery Throughput (Tonnes per minute) | NA | NA | 0.286 | 0.36 | 0.51 | NA | NA | NA | NA | NA | NA |
| Reduction of MOG (x) | | 6 | | 10.2 | 14 | | 33 | | 68 | | 3.5 |

4. The apparatus of claim 1, wherein each shaft is provided with between 3 and 9 rollers.

5. The apparatus of claim 1, wherein each roller has a cross-sectional length of between 200 mm and 120 mm.

6. The apparatus of claim 1, wherein the width of the rollers is between 16 mm and 10 mm .

7. The apparatus of claim 1, wherein:
the second separating conveyor system is inclined at an angle of between 10 and 30 degrees relative to horizontal; or
the second separating conveyor system is inclined at an angle of between 15 and 25 degrees relative to horizontal; or
the second separating conveyor system is inclined at an angle of between 18 and 22 degrees relative to horizontal; or
the second separating conveyor system is inclined at an angle of about 20 degrees relative to horizontal.

8. The apparatus of claim 1, wherein the continuous belt of the first separating conveyor system is a continuous mesh belt or a continuous grate belt providing the plurality of openings.

9. The apparatus of claim 1, further comprising a hopper for receiving harvested plant material and directing it to an upstream portion of the first separating conveyor system.

10. The apparatus of claim 1, wherein the shafts are spaced along a plane at an orientation and distance relative to one or more adjacent shafts such that a radially-extending roller on a shaft extends into a space between two adjacent radially-extending rollers on an adjacent shaft to provide an array of rollers and a plurality of openings.

11. The apparatus of claim 10, wherein the radially-extending rollers comprise multiple projections, radially-extending from the shaft to define the roller, wherein the radially-extending rollers are disposed perpendicular to the shaft.

12. The apparatus of claim 11, wherein the radially-extending projections extend from the shaft in an arc away from the direction of rotation of the radially-extending rollers.

13. The apparatus of claim 1, wherein the de-stemming unit comprises a series of separated rotating fingers, provided on a shaft, which rotate to dislodge fruit that are still attached to other plant material or that are still in bunches to produce dislodged fruit that can pass through the openings in the second separating conveyor system.

14. A method for separating fruit from other plant matter from harvested plant material, the method comprising:
providing an apparatus comprising:
a first separating conveyor system for conveying harvested plant material in an upstream to downstream direction, the first separating conveyor system including a plurality of openings;
a second separating conveyor system comprising a series of adjacent shafts having an array of rollers, the rollers rotatable to convey harvested plant material in an upstream to downstream direction and spaced apart to form a plurality of openings therebetween permitting the transit of separated fruit therethrough while preventing the transit of other plant matter, the series of adjacent shafts comprising at least four shafts that are not vertically axially aligned with the first separating conveyer system, such that fruit transiting via the at least four shafts do not transit to the first separating conveyor system,
providing a hopper positioned above the first second separating conveyor system,
wherein the hopper receives harvested plant material and directs it to an upstream end of the second separating conveyor system that comprises the at least four shafts; and
wherein the first and second separating conveyor systems are arranged such that fruit and other plant matter that have not transited via the at least four shafts of the second conveyor system are deposited onto the first conveyor system that conveys harvested plant material in an upstream to downstream direction and permits the transit of separated fruit therethrough while preventing the transit of other plant matter, such that fruit that pass through the second conveyer system are collected.

15. The method of claim 14, wherein the apparatus further comprises a de-stemming unit positioned above the first separating conveyor system downstream of the second separating conveyor system.

16. The method of claim 14, wherein the first separating conveyor system comprises a continuous belt mounted to rotate around an upstream shaft and a downstream shaft.

17. The method of claim 14, wherein the shafts are spaced along a plane at an orientation and distance relative to one or more adjacent shafts such that a radially-extending roller on a shaft extends into a space between two adjacent radially-extending rollers on an adjacent shaft to provide the array of rollers and the plurality of openings.

* * * * *